UNITED STATES PATENT OFFICE.

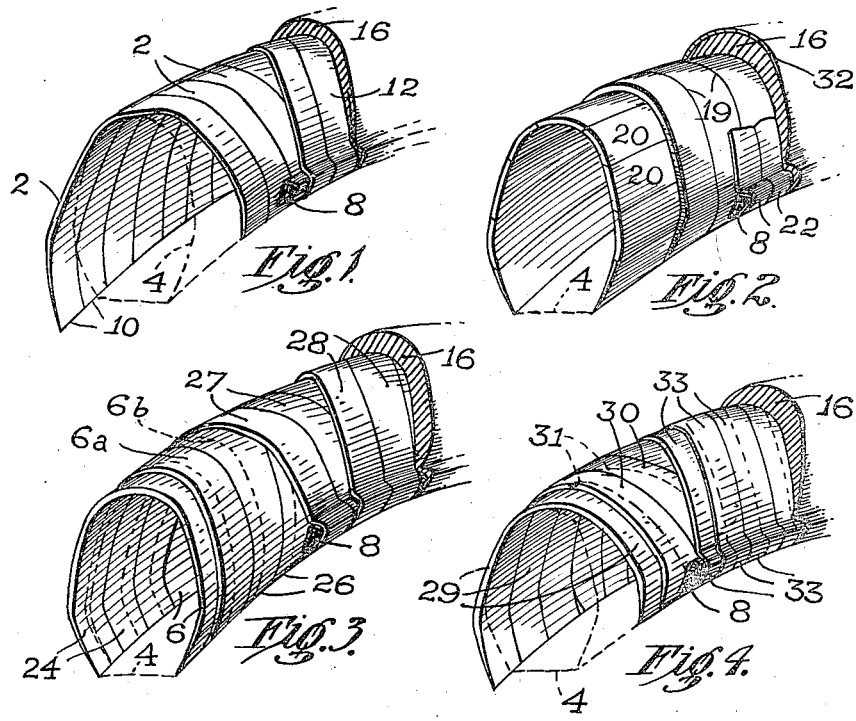
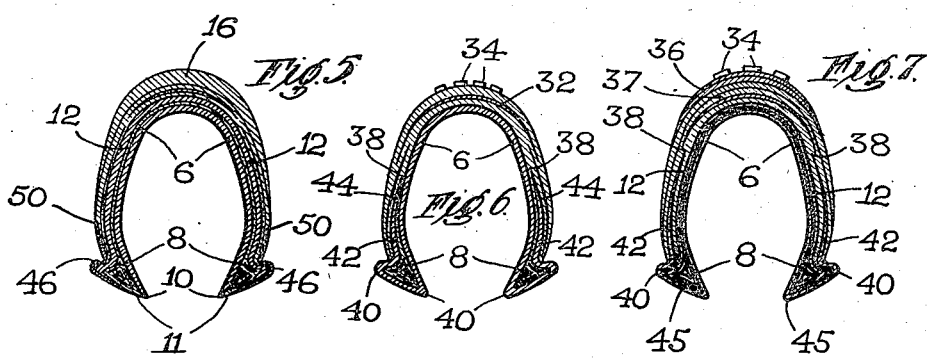

ADOLF MARTIN KOBIOLKE, OF KEW, VICTORIA, AUSTRALIA.

PROCESS OF FORMING TIRE CASINGS OR COVERS.

1,261,821.　　　　　　　Specification of Letters Patent.　　　Patented Apr. 9, 1918.

Original application filed November 20, 1914, Serial No. 873,147. Divided and this application filed November 7, 1916. Serial No. 130,024.

*To all whom it may concern:*

Be it known that I, ADOLF MARTIN KOBIOLKE, a citizen of the Commonwealth of Australia, residing at 18 Gordon avenue, Kew, in the State of Victoria, Commonwealth of Australia, have invented a new and useful Improved Process of Forming Tire Casings or Covers, of which the following is a specification.

This invention relates to an improved process of manufacturing or forming pneumatic tire covers and has been devised in order to provide a pneumatic tire cover constructed in such a manner that strength will be combined with flexibility, and the risk of accidents will be obviated, the covers so manufactured or produced being superior and more durable than those at present in use. In particular this invention relates to a process of manufacturing tire casings of the type disclosed and claimed in my copending application Ser. No. 873,147, filed November 20, 1914, of which this application is a division.

With a pneumatic tire casing constructed according to this invention, the possibility of punctures is reduced to a minimum, and the tire may be re-treaded without injury to the casing, which is so constructed that the necessary strength is given to all the parts thereof, but the walls are given greater strength to overcome stresses or strains that may be imparted thereto. The bead is so formed that casting of the tires from the wheel is prevented, flaws are obviated and the tire casing is so constructed that no more rubber is required than is used with the covers at present in use, and the maximum amount of flexibility is combined with durability.

According to this invention and in the method of manufacture thereof, leather of suitable flexibility forms the basis or foundation of the cover casing and may be partially tanned before being treated with rubber solution, and, if desired, its surface may be roughened to facilitate the entry of the solution into it, or the leather may be cut into strips of suitable size and shape suitable for the purposes to be hereinafter described, and mixed with the rubber solution of dough.

The leather forming the foundation or base of the shell of the cover is preferably placed in a vacuum chamber in which vacuum is created so as to draw all the air out of the foundation of leather.

A compound of rubber dissolved in a suitable solvent such as benzin so that it is in the form of a semi-liquid mass or dough is then fed into this chamber and is forced under pressure or otherwise into the interstices of the leather.

The leather strips so treated are of a length suitable to pass, when arranged diagonally, around the sides and top of the mold from bead to bead to form the inner lining or shell of the casing, and the leather strips are of suitable flexibility and width.

For a better understanding of the invention and of its advantages, reference will now be had to the accompanying drawings in which:

Figure 1 is a view in perspective of a portion of a pneumatic tire cover constructed according to this invention.

Figs. 2, 3 and 4 are views in perspective of alternative constructions or arrangements of the parts forming the improved tire.

Figs. 5, 6 and 7 are transverse sectional views of tires constructed according to this invention.

Referring more particularly to Fig. 1, the inner shell 6 of the cover casing is worked upon the mold 4 and consists of a series of diagonally arranged strips 2 of leather impregnated with rubber and of suitable flexibility, being arranged around and in line with each other upon the mold.

The bead 8 which may be rubber or other suitable material or composition of materials is then placed in position upon the outside of this shell and an outer shell 12 is constructed of strips 2 arranged diagonally in line with each other around the inner shell on the outside of the bead and in a direction opposite to the strips forming the inner shell.

In order to present an even surface around and upon the cover or shell, a strip or strips of suitable material, such as rubber impregnated leather, may be arranged outside and inside the cover or between each series of diagonally arranged strips forming the inner and outer shell of the casing.

Alternatively, only those portions which present an uneven surface or the joints of the leather impregnated strips may be packed to present a uniformity of surface, while the joints of the inner shell may be overlapped by the next succeeding shell.

Instead of being arranged diagonally the strips of rubber impregnated leather forming the inner and outer shells may be arranged transversely or circumferentially, if desired.

In Fig. 2 the casing is composed of a series of strips 18 arranged circumferentially around the mold 4 with the next series of strips 20 arranged transversely from edge to edge of the inner shell 10, while a further shell constructed of transversely arranged strips 22 is provided passing around the bead 8 and transversely around the intermediate shell 20, the joints 19 of the shell 20 being covered or overlapped by the strips 22 of the outer shell.

As illustrated in Fig. 3, the inner shell 6 and second shell 6ª are constructed of a series of transversely arranged strips 24 and 26 respectively while a third shell is arranged with the rubber impregnated strips 27 arranged diagonally around the inner shells 6 and 6ª, the strips of the intermediate shell 6ª being arranged to overlap each of the joints 6ᵇ of the inner shell 6. An outer shell may be provided consisting of diagonally arranged strips 28, the shells 27 and 28 passing around the shells 6 and 6ª, the diagonally arranged strips of each shell 27 and 28 being arranged in opposite directions to each other, and the spaces between them filled with rubber impregnated strips to form a smooth surface.

In the construction illustrated in Fig. 4, the shell consists of a series of diagonally arranged strips 29, the second shell comprising a series of diagonally arranged strips 30, being provided and arranged around the inner shell, each strip overlapping the joints 31 thereof. The bead 8 may then be fitted and one or more shells 33 constructed of strips arranged diagonally of the inner shells passing around the beads 8 and around the second shell 30 and in a direction opposite to the inner shells, the joints of each inner shell being overlapped by the next succeeding shell.

It will be readily understood that according to the weight of the tire required, a greater number of sets of diagonally, transversely or circumferentially arranged rubber impregnated leather strips may be worked upon the mold 4, each series being arranged in alternate directions, or, if desired, two series in one direction and two series in the other direction, or the shells composed of the impregnated strips above described may be worked upon the mold in the one direction, it being readily understood that various combinations may be arranged without departing from the spirit and scope of the invention.

To complete the cover, the ordinary tread 16 of rubber or other composition or material is then fitted to the tire casing and the outer and other portions of the mold are fitted around the cover. The whole is then placed or treated under the action of a hydraulic or other press and vulcanized by heat while under this pressure, the pressure being applied in such a manner that it is evenly distributed and imparted to the whole of the cover in the mold. When removed from the mold the cover is finished in the ordinary way.

The tire casing is preferably semi-vulcanized, then the semi-cured tread put on, and the whole finished together.

It will be understood that the tread 16 may also be constructed of a series of transversely arranged leather strips 32 and, as illustrated in Figs. 2, 6 and 7, the tread may be fitted with suitable studs 34 in the ordinary manner, or as illustrated in Fig. 7, the tread may comprise a series of rubber impregnated strips 36 spaced from the inner shell by rubber 37 and forming a foundation for the studs 34.

In order to obtain the necessary strength at the bead and to prevent the casting of the tire from the wheel, the side walls and edges of the tire are formed as illustrated in cross-section in Figs. 5, 6 and 7.

In Fig. 6 the edges 38 of the layer of the inner case or shell are suitably skived, and are preferably brought or turned around the beads 8 at 40 and extended upwardly at 42 to a suitable point 44 on the outside of the walls thereof in such a manner that it strengthens the wall, and also prevents the rim from cutting the strain bearing parts of the tire casing.

Alternatively, as illustrated in Fig. 7, two of the shells 6 and 12 may have their edges turned around the beads 8 in opposite directions from and to the inner edge of the beads, being skived at the ends and arranged in such a manner that the edges 38 of the inner shell 6 connect the walls of the casing while the edges 45 of the outer shell 12 terminate at the inner edge of the beads 8 within the bend of the inner shell 6.

Again as illustrated in Fig. 5, the skived edges 10 of the inner shell 6 may terminate at the inner edge of the tire and the edges 11 of the intermediate shell 12 terminate approximately at the point or edge of the inner shell after passing the bead in the manner illustrated. A third shell 46 or cover may start at the inner corner of the beads and project around the bead outside the casing upwardly to a suitable point 50 around the walls to form a cover or protection for the strain bearing portions of the cover against rim cutting.

With a pneumatic tire cover constructed as above described, a durable and more superior article than those at present in use will be produced, the cover combining more flexibility with the greater durability, so obviating the risks of accidents.

What I do claim as my invention and desire to secure by Letters Patent is:

The process of forming a tire casing comprising the steps of forming a plurality of strips of rubber impregnated partially tanned leather into a shell, arranging a plurality of strips at an angle to said first mentioned strips to form a second shell, placing marginal beads between said shells in the proper position, lapping the edges of the strips of one of said shells over said beads and lapping the edges of the strips forming the other of said shells over said beads and the edges of the former shell, a base portion being thereby formed, applying a partially cured rubber tread portion to said base portion, and vulcanizing the whole.

In witness whereof I have hereunto set my hand in the presence of two witnesses.

ADOLF MARTIN KOBIOLKE.

Witnesses:
SIDNEY HENDLEY,
J. BOUSTIERE.